H. M. SANDERS.
HAY RACK FASTENER.
APPLICATION FILED JUNE 12, 1914.
1,172,487.
Patented Feb. 22, 1916.
2 SHEETS—SHEET 2.
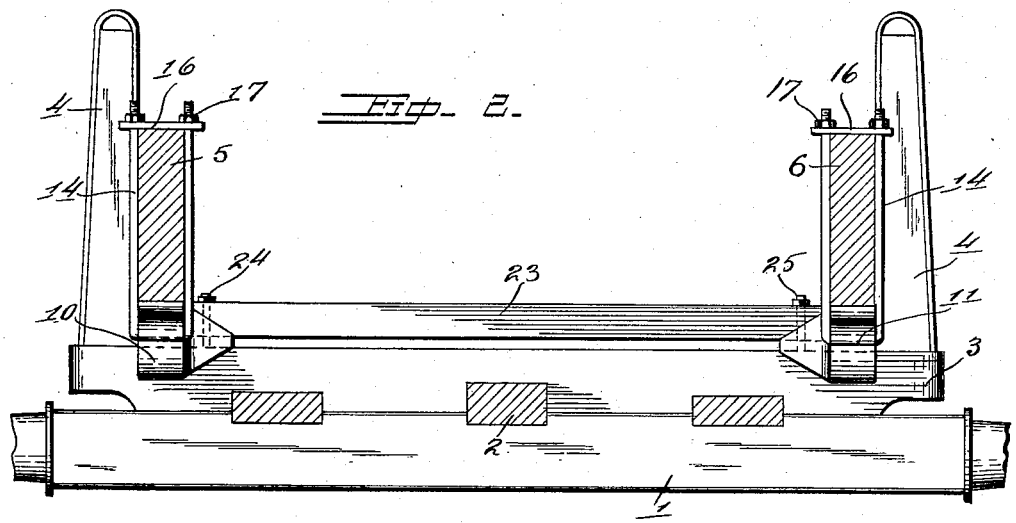
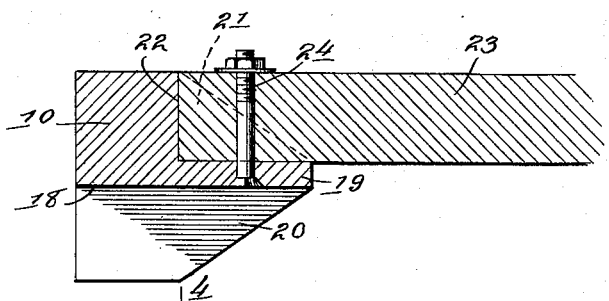
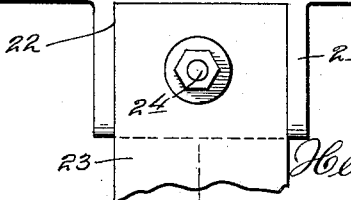
Witnesses
Edw. S. Hall.
Lloyd W. Patch.
Inventor
Herman M. Sanders.
By Richard B. Owen.
Attorney

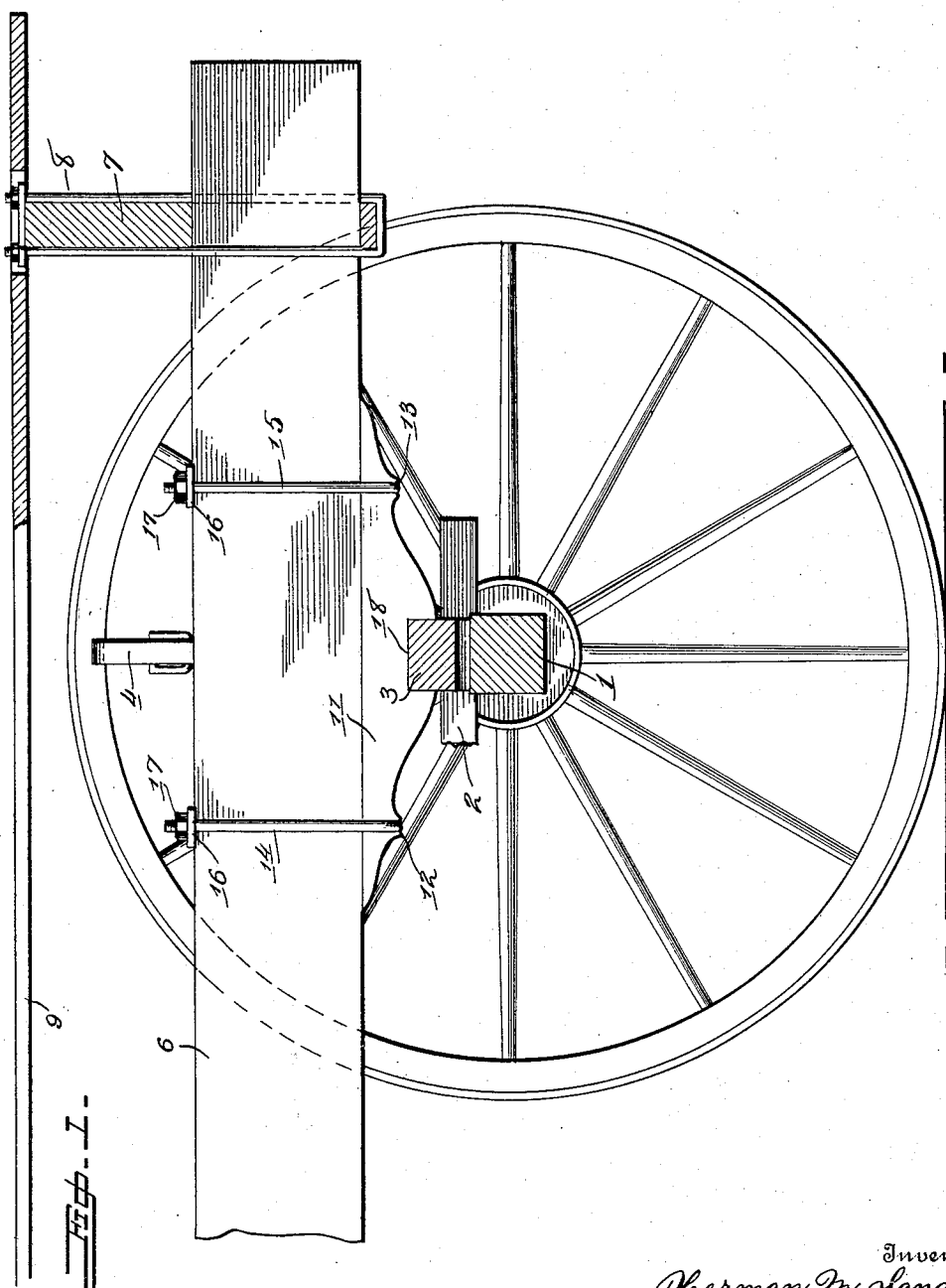

UNITED STATES PATENT OFFICE.

HERMAN M. SANDERS, OF FARMINGTON, MINNESOTA.

HAY-RACK FASTENER.

1,172,487.     Specification of Letters Patent.     Patented Feb. 22, 1916.

Application filed June 12, 1914. Serial No. 844,752.

*To all whom it may concern:*

Be it known that I, HERMAN M. SANDERS, a citizen of the United States, residing at Farmington, in the county of Dakota and State of Minnesota, have invented certain new and useful Improvements in Hay-Rack Fasteners, of which the following is a specification.

An object of my invention is to provide yokes to be secured to the bed pieces of an ordinary hay rack at the point where these bed pieces rest on the rear bolster of the wagon and to fit over the bolster, thus preventing wear upon the bed pieces of the rack and precluding endwise shifting of the rack.

A further object is to so construct the yoke that a cross brace may be secured therebetween to hold the bed pieces properly alined and spread apart to fit against the bolster stake of the wagon.

With other objects in view, which will be referred to, my invention consists in the peculiar combination and novel arrangement of parts, such as will be hereinafter more fully described in connection with the accompanying drawings and more particularly pointed out in the appended claims.

In the drawings: Figure 1 is a view in side elevation of the rear end of a wagon and hay rack with my invention applied thereto and the parts broken away more clearly to illustrate the structure. Fig. 2 is a transverse vertical sectional view through the hay rack and wagon structure taken just forward of the rear axle. Fig. 3 is a view in top plan of one of the yokes. Fig. 4 is a vertical sectional view on the line 4—4 of Fig. 3.

The wagon shown in the present disclosure is of the form usually designated as a lumber wagon and the parts thereof are of the usual type, the rear axle 1 having the wheels mounted thereon and connected with the forward axle by the reach 2. The bolster 3 is secured on the upper side of this axle 1 and has the bolster stakes 4 secured to the ends thereof to hold the box against sidewise displacement. The hay rack is also of the usual construction, comprising the bed pieces 5 and 6 secured to the cross member 7 and held in an upright position by the U bolts 8, and the rack bars 9 are secured upon the ends of the cross member to form the extension sides of the rack.

My fastening means comprises the yoke members 10 and 11 which are adapted to be secured on the lower edges of the bed pieces 5 and 6 at the point where these bed pieces would normally rest upon the bolster 3 at the rear end of the wagon. The yokes 10 and 11, which are substantially duplicates, have the upper faces thereof made straight and plain to fit against the lower edges of the bed pieces 5 and 6 of the rack, notches 12 and 13 are formed transversely of the yoke members on the lower edges thereof near each end and the U bolts 14 and 15 are fitted in these notches to extend up along the sides of the bed pieces 5 and 6 and are secured to the clamp plates 16 received against the upper edges of the bed pieces by the nuts 17 fitted on the screw threaded ends of these U bolts.

Each of the yoke members has a notch 18 provided in the approximate longitudinal center of its lower edge, which notches are made of a dimension and configuration to fit over the upper edge of the bolster 3. A top flange 19 is formed to extend from the inner face of each of the yokes and to lie in a plane to broaden the upper bearing surface of the notch 18, the side flanges 20 being provided to give a greater bearing surface at the sides of the notch 18 against the bolster. Side flanges 21 similar to the flanges 20 are provided at the upper edges of the flange 19 and thus the socket 22 is formed. A cross brace 23 is fitted at its ends into the sockets of the yoke members 10 and 11 and this cross brace is held secured within the socket by the bolts 24 and 25 which pass through the flanges 19 and through the end of the brace, this cross brace being of a sufficient longitudinal extent that when secured in place, the bed pieces are held in close proximity to the bolster stake 4.

From the foregoing it will be seen that I have provided a hay rack fastener, the parts of which are so constructed and arranged that the rack is held against longitudinal displacement and is engaged between the bolster stakes to prevent lateral displacement. By the use of this fastener, the rack is protected against wearing at the point of its engagement with the bolster.

While I have herein shown and described one specific form of my invention, it will be understood that slight changes might be made in the form and arrangement of the several parts without departing from the spirit and scope of my invention, and hence I do not wish to be limited thereto except for such limitations as the claims may import.

I claim:—

1. A hay rack fastener comprising a pair of interchangeable yoke members made of a transverse dimension to correspond approximately to the thickness of the bed pieces of a hay rack and each provided with a centrally disposed transversely extending notch on its lower edge to be fitted and received over the bolster of a wagon, said yoke members provided with transversely extending notches adjacent each end thereof, U-bolt members mounted with the looped portions in the end notches of said yoke members and having the free ends thereof extended upwardly along the sides of said members and in proximity thereto, plates received across the upper edges of the bed pieces and fitted over the free ends of the U-bolt members, and nuts mounted on the ends of said U-bolt members to clamp the plates against the bed pieces and to bring the loops of said U-bolt members into a bearing engagement in the notches to hold the yoke members rigidly mounted on the bed pieces.

2. A hay rack fastener comprising a pair of interchangeable yoke members to be secured to the lower edges of the bed pieces of a hay rack and each provided with transversely extending notches on their lower edges to be received over the bolster of a wagon, said yoke members provided with notches disposed adjacent each end thereof U-bolt members mounted to have the loops thereof engaged in the end notches of said yoke members and the free ends extending up along the sides of the bed members, plates received across the upper edge of the bed members and fitted to the free ends of said U-bolt members, nuts received on said members to bear against the plates and to tighten the U-bolts against the yokes to secure the same in the proper operative relation upon the lower edges of the bed pieces, each of said yoke members provided with laterally extending flanges arranged to form a socket, and a cross member secured between said yoke members and in said socket to hold the yoke members in a spaced-apart relation and thus space the bed members of the rack.

3. A hay rack fastener comprising interchangeable yoke members to be secured to the lower edge of the bed pieces of the hay rack at each side thereof and provided on their lower edges with notches to be received over the bolster of the wagon, flanges formed from the inner faces of the yoke members adjacent said notches to provide sockets, a cross brace fitted between said yokes to rest at its ends in said sockets, means to hold the cross brace and the yoke members rigidly secured together, each of said yoke members provided with transversely extending notches on the lower faces thereof at each end, U-bolt members fitted to have the loops thereof received in said notches and the free ends extended up along the sides of the bed pieces, a clamp plate fitted over the free ends of said U-bolt members to bear against the upper edge of the bed pieces, and clamp nuts to bring the clamp plate to a proper bearing upon the bed pieces to secure the yoke members in the operative relation.

In testimony whereof I affix my signature in presence of two witnesses.

HERMAN M. SANDERS.

Witnesses:
 FRED W. BREMER,
 G. W. BANE.

Copies of this patent may be obtained for five cents each, by addressing the "Commissioner of Patents, Washington, D. C."